(12) United States Patent
Hinz et al.

(10) Patent No.: US 7,671,228 B2
(45) Date of Patent: *Mar. 2, 2010

(54) METHOD OF FORMING A POLYETHERCARBONATE POLYOL USING A $CO_2$-PHILIC COMPOUND OR SUBSTITUENT

(75) Inventors: Werner Hinz, Grosse Ile, MI (US); Jacob Wildeson, Chambersburg, PA (US); Edward M. Dexheimer, Grosse Ile, MI (US)

(73) Assignee: BASF Corporation, Florham Park, NJ (US)

( * ) Notice: Subject to any disclaimer, the term of this patent is extended or adjusted under 35 U.S.C. 154(b) by 1307 days.

This patent is subject to a terminal disclaimer.

(21) Appl. No.: 11/092,107

(22) Filed: Mar. 29, 2005

(65) Prior Publication Data

US 2006/0224010 A1    Oct. 5, 2006

(51) Int. Cl.
*C07C 69/96* (2006.01)

(52) U.S. Cl. ..................................... 558/276

(58) Field of Classification Search ............... 558/276; 528/196, 198, 403, 405, 411, 412, 413, 415, 528/419; 502/150; 521/172
See application file for complete search history.

(56) References Cited

U.S. PATENT DOCUMENTS

| | | |
|---|---|---|
| 4,472,560 A | 9/1984 | Kuyper et al. |
| 4,500,704 A | 2/1985 | Kruper, Jr. et al. |
| 4,826,887 A | 5/1989 | Kuyper et al. |
| 4,826,952 A | 5/1989 | Kuyper et al. |
| 4,826,953 A | 5/1989 | Kuyper et al. |
| 6,303,833 B1 | 10/2001 | Grosch et al. |
| 6,747,169 B2 * | 6/2004 | Yanagi et al. ............... 560/153 |
| 6,762,278 B2 * | 7/2004 | Hinz et al. .................. 528/405 |
| 7,268,204 B2 * | 9/2007 | Hinz et al. .................. 528/196 |
| 2003/0032761 A1 | 2/2003 | Hofmann et al. |
| 2003/0149232 A1 * | 8/2003 | Hinz et al. .................. 528/412 |
| 2006/0223973 A1 * | 10/2006 | Hinz et al. .................. 528/196 |

* cited by examiner

*Primary Examiner*—Jafar Parsa
*Assistant Examiner*—Chukwuma O Nwaonicha
(74) *Attorney, Agent, or Firm*—Howard & Howard Attorneys PLLC

(57) ABSTRACT

A method of forming a polyethercarbonate polyol enhances incorporation of $CO_2$ into the polyethercarbonate polyol. The method provides a catalyst including a multimetal cyanide compound. An H-functional initiator, an alkylene oxide, and $CO_2$ are reacted in the presence of the multimetal cyanide compound in a reactor. The method further provides a $CO_2$-philic compound or a $CO_2$-philic substituent. The $CO_2$-philic compound and substituent enhance incorporation of the $CO_2$ into the polyethercarbonate polyol and reduce formation of cyclic alkylene carbonates, such as cyclic propylene carbonate, which are undesirable byproducts.

32 Claims, No Drawings

METHOD OF FORMING A POLYETHERCARBONATE POLYOL USING A $CO_2$-PHILIC COMPOUND OR SUBSTITUENT

TECHNICAL FIELD

The present invention generally relates to a method of forming a polyethercarbonate (PEC) polyol. More specifically, the method provides a $CO_2$-philic compound or a $CO_2$-philic substituent thereby enhancing incorporation of $CO_2$ into the PEC polyol and thereby reducing the formation of cyclic alkylene carbonates, such as cyclic propylene carbonate, which are undesirable byproducts.

BACKGROUND OF THE INVENTION

Polyethercarbonate (PEC) polyols are known in the art. PEC polyols are utilized, in conjunction with a cross-linking agent, such as an isocyanate, to produce polyurethane polymers. The polyurethane polymers can be foamed or non-foamed, i.e., elastomeric. Generally, PEC polyols are the polymerization reaction product of a H-functional initiator, an alkylene oxide, and carbon dioxide and these reactants are reacted in a reactor in the presence of a catalyst. Most recently, there has been a significant focus on using catalysts that include a multimetal cyanide compound to catalyze the reaction of the H-functional initiator, the alkylene oxide, and carbon dioxide to form the PEC polyols.

Various methods of forming PEC polyols are also known in the art. Generally, in the various methods, first and second reaction phases are present in the reactor. The first reaction phase is liquid and includes the H-functional initiator, dissolved alkylene oxide and carbon dioxide, the multimetal cyanide compound, and the forming PEC polyol. The second reaction phase is either gaseous or supercritical and includes gaseous alkylene oxide and carbon dioxide or supercritical alkylene oxide and carbon dioxide, respectively.

It has been found, however, that the solubility of $CO_2$ in the liquid first reaction phase is very limited. The data in the following table exhibits an overall low level of $CO_2$ solubility and also exhibits diminishing $CO_2$ solubility with increasing temperatures in the reactor. The following table more specifically exhibits $CO_2$ solubility, indicated as a percentage (%), in a typical polyether polyol. The typical polyether polyol has a hydroxyl number of 35 and was formed from a glycerine initiator and propylene oxide (PO) and ethylene oxide (EO) at 18% capping.

| Atm | % 0° C. | Atm | % 16° C. | Atm | % 25° C. | Atm | % 49° C. |
|---|---|---|---|---|---|---|---|
| 1.60 | 0.3168 | 1.67 | 0.301 | 1.58 | 0.3210 | 1.67 | 0.3014 |
| 3.99 | 1.3858 | 4.17 | 1.347 | 4.18 | 1.3445 | 4.61 | 1.2564 |
| 6.65 | 3.1898 | 7.07 | 3.091 | 7.88 | 2.8999 | 10.27 | 2.3453 |
| 9.57 | 5.3909 | 10.32 | 5.198 | 12.18 | 4.7265 | 16.18 | 3.7468 |
| 12.50 | 7.4476 | 13.48 | 7.057 | 16.44 | 5.9087 | 21.57 | 3.9987 |
| 15.84 | 10.4064 | 17.22 | 9.523 | 21.31 | 6.9977 | 26.05 | 4.2002 |

It has also been found that the solubility of the various components of the liquid first reaction phase in $CO_2$ is similarly limited. That is, the solubility of the H-functional initiator, the alkylene oxide, the multimetal cyanide compound, and the forming PEC polyol in $CO_2$ is limited.

Due to the solubility limitations described above, $CO_2$ availability in the liquid first reaction phase is low. Because copolymerization of the alkylene oxide and $CO_2$ to form the PEC polyol takes place in the liquid first reaction phase, incorporation of the $CO_2$ into the PEC polyol is limited. Furthermore, reaction at the interface between the liquid first reaction phase and the second reaction phase is even more restricted and does not contribute significantly to the methods of forming the PEC polyol. Thus, the conventional methods of forming the PEC polyol and the quality of the PEC polyols that are formed are insufficient. The limited availability of $CO_2$ in the liquid first reaction phase restricts the overall efficiency of the methods of forming the PEC polyol, leading to long reaction times and low yields. The limited availability of $CO_2$ in the liquid first reaction phase also restricts the quality of the PEC polyols that are formed because these polyols have limited $CO_2$ incorporation.

To combat the insufficiency of the methods of forming the PEC polyol and the PEC polyols that are formed, high $CO_2$ pressures and/or low process temperatures are required to generate PEC polyols with adequate $CO_2$ content. It is known that high $CO_2$ pressures and low process temperatures are undesirable due to the high cost of high pressure equipment and due to the high catalyst (multimetal cyanide compound) concentrations and/or long cycle times required when low process temperatures are employed.

In addition to the solubility, and resulting $CO_2$ availability, limitations described above, conventional multimetal cyanide compounds are ionic, highly polar, and therefore $CO_2$-phobic. That is, the conventional multimetal cyanide compounds repel $CO_2$ which is non-polar. Ultimately, this repulsion also has the effect of reducing $CO_2$ availability in the liquid first reaction phase, specifically at catalytic sites on a surface of the multimetal cyanide compound. The conventional multimetal cyanide compounds may be further deficient by contributing to the formation of cyclic alkylene carbonates, which are undesirable byproducts. Formation of the cyclic alkylene carbonates reduces the overall yield of the desired PEC polyol.

In view of the limitations that exist in the prior art, including those described above, there remains an opportunity to improve solubility thereby increasing $CO_2$ availability when forming the PEC polyol. There also remains an opportunity to render the catalyst, including the multimetal cyanide compound, more compatible with $CO_2$.

SUMMARY OF THE INVENTION AND ADVANTAGES

A method of forming a polyethercarbonate (PEC) polyol is disclosed. The method includes the step of providing a catalyst. The catalyst comprises a multimetal cyanide compound. The method also includes reacting an H-functional initiator, an alkylene oxide, and $CO_2$. The H-functional initiator, the alkylene oxide, and $CO_2$ are reacted in the presence of the multimetal cyanide compound in a reactor to form the polyethercarbonate polyol. The method further includes providing a $CO_2$-philic compound or a $CO_2$-philic substituent. The $CO_2$-philic compound or substituent enhances incorporation of the $CO_2$ into the PEC polyol.

The method of the present invention permits one to efficiently form PEC polyols by enhancing incorporation of the $CO_2$ into the PEC polyol. The $CO_2$-philic compounds accomplish this enhanced incorporation by increasing solubility of $CO_2$ in a first reaction phase which is liquid. At the same time, such $CO_2$-philic compounds increase solubility of various components of the first reaction phase in $CO_2$ in a second, gaseous or supercritical, reaction phase. These $CO_2$-philic compounds, therefore, increase transfer of the reactants between the first and second reaction phases. The $CO_2$-philic substituents accomplish this enhanced incorporation by rendering the catalyst, specifically the multimetal cyanide compound, and more specifically a surface of the multimetal cyanide compound, more compatible with $CO_2$. As a result of the catalyst being more compatible with $CO_2$, $CO_2$ concentration at catalytic centers on the surface of the catalyst can be increased. Surprisingly, it has been found that the increased $CO_2$ concentration on the surface of the catalyst simultaneously provides for increased $CO_2$ reactivity and incorporation into the PEC polyol.

Overall, the $CO_2$-philic compound and the $CO_2$-philic substituent, independently or in combination, increase $CO_2$ availability when forming the PEC polyol. As a result, high $CO_2$ pressures and low process temperatures are not required. Thus, high pressure equipment, high catalyst concentrations, and long cycle times are not required in the method of the present invention. Additionally, with the $CO_2$-philic compounds and substituents of the present invention formation of undesirable cyclic alkylene carbonate byproducts is reduced.

DETAILED DESCRIPTION OF PREFERRED EMBODIMENTS

A method of forming a polyethercarbonate (PEC) polyol is disclosed. Preferably, the PEC polyol formed according to the present invention is utilized, in conjunction with a suitable cross-linking agent, such as an isocyanate, to produce foamed and non-foamed, i.e., elastomeric, polyurethane polymers. Some suitable isocyanates for use in conjunction with the PEC polyol are described generally below. Further, as also described below, the PEC polyol formed according to the present invention has enhanced incorporation of $CO_2$ in the PEC polyol.

The method provides a catalyst that comprises a multimetal cyanide compound. The multimetal cyanide compound is described additionally below. Generally, the PEC polyol is the polymerization reaction product of an H-functional initiator, an alkylene oxide, and carbon dioxide (collectively "the reactants"). Like the isocyanates, some suitable H-functional initiators and alkylene oxides are also generally described below. The method reacts the reactants, preferably under a positive pressure, in the presence of the multimetal cyanide compound in a reactor to form the PEC polyol. The PEC polyol is essentially a copolymer of alkylene oxide and carbon dioxide formed in the presence of the multimetal cyanide compound.

Although not required, a large-scale semi-batch reactor, such as an industrial autoclave, is preferred. Furthermore, it is known that, during the reaction, first and second reaction phases are present in the reactor. The first reaction phase is liquid and includes the H-functional initiator, dissolved alkylene oxide and $CO_2$, the multimetal cyanide compound, and the PEC polyol that is forming. The second reaction phase includes gaseous or supercritical alkylene oxide and $CO_2$. More specifically, the second reaction phase may be gas and would therefore comprise gaseous alkylene oxide and gaseous $CO_2$ or the second reaction phase may be under supercritical conditions including a fluid phase comprising supercritical alkylene oxide and supercritical $CO_2$.

The method of the present invention also provides a $CO_2$-philic compound or a $CO_2$-philic substituent. For the purposes of the present invention, the terminology "$CO_2$-philic" comprises a class of non-polar compounds or substituents which enhance the solubility of $CO_2$ in the liquid first reaction phase or which increase the affinity of $CO_2$ to a surface of the catalyst while themselves being considerably soluble in the liquid first reaction phase. Together, the $CO_2$-philic compound and the $CO_2$-philic substituent may also be referred to as $CO_2$-philic media or $CO_2$-philic agents. The $CO_2$-philic compound and the $CO_2$-philic substituent, independently or in combination with each other, enhance incorporation of the $CO_2$ into the PEC polyol. More specifically, during the reaction, the $CO_2$-philic compound and the $CO_2$-philic substituent establish a reaction environment that, overall, has enhanced $CO_2$-philicity. As such, the $CO_2$-philic compound and the $CO_2$-philic substituent increase $CO_2$ availability when forming the PEC polyol, which is desirable.

In a first embodiment, the $CO_2$-philic compound is provided. Preferably, the $CO_2$-philic compound comprises a fluorine-based compound. As the $CO_2$-philic compound, the fluorine-based compound enhances incorporation of the $CO_2$ into the PEC polyol. It is also preferred that the $CO_2$-philic compound is a surfactant and is soluble in the reaction environment. It is further preferred that the fluorine-based compound has a first segment and a second segment. The first segment includes a polyether. The second segment includes at least one of a polyfluorinated alcohol, a polyfluorinated fatty acid, such as polyfluorinated stearate, a polyfluorinated alkyl compound, a polyfluorinated phosphate, and a polyfluorinated alkyl propionate. That is, the second segment can include the polyfluorinated alcohol by itself, the polyfluorinated fatty acid by itself, the polyfluorinated alkyl compound by itself, the polyfluorinated phosphate by itself, the polyfluorinated alkyl propionate by itself, the polyfluorinated stearate by itself, any combination of two or more of these components, even including all six of these components. Suitable fluorine-based compounds include, but are not limited to, 2-perfluoroalkylethylstearate, 2-perfluoroalkylethanol, 2-(perfluoroalkyl)ethyl phosphate, fluoropyridine, perfluoroalkylpropionate, and combinations thereof. 2-perfluoroalkylethylstearate is commercially available as ZONYL® FTS, 2-perfluoroalkylethanol is commercially available as ZONYL® BA-L, and 2-(perfluoroalkyl)ethyl phosphate is commercially available as ZONYL® FSE, all from Aldrich.

This first embodiment primarily focuses on providing the $CO_2$-philic compound into the first reaction phase. With the $CO_2$-philic compound in the first reaction phase, which is liquid, a solubility of $CO_2$ in the first reaction phase is increased. At the same time, the $CO_2$-philic compound also increases solubility of various components, such as the H-functional initiator, the alkylene oxide, and the forming PEC polyol, of the first reaction phase in the gaseous or supercritical $CO_2$ present in the second reaction phase. Preferably, the $CO_2$-philic compound is provided in an amount of at least 10%, more preferably of at least 100%, most preferably of at least 200%, based on a weight of the catalyst.

In a second embodiment, the $CO_2$-philic substituent is provided. The $CO_2$-philic substituent can be introduced at various points in the present method. For example, the $CO_2$-philic substituent can be introduced prior to the reacting of the H-functional initiator, the alkylene oxide, and $CO_2$. If the $CO_2$-philic substituent is introduced prior the reacting, then it is preferred that the $CO_2$-philic substituent is incorporated, such as by being reacted, into the multimetal cyanide compound, which is described below. As a further example, however, the $CO_2$-philic substituent is not first reacted into the multimetal cyanide compound and is, instead, introduced during the reacting of the H-functional initiator, the alkylene oxide, and $CO_2$ in the presence of the multimetal metal cyanide compound.

The $CO_2$-philic substituent is distinguishable from the $CO_2$-philic compound described above in that the $CO_2$-philic substituent can also simply include a fluorine atom, rather than a requiring a compound. As alluded to above, the method of the present invention can provide the $CO_2$-philic substituent independent of or in combination with the $CO_2$-philic compound.

Preferably, the $CO_2$-philic substituent comprises fluorine. Alternatively, the $CO_2$-philic substituent includes a fluorine-based substituent. If the $CO_2$-philic substituent includes the fluorine-based substituent, then it is desirable that the fluorine based substituent is selected from the group of polyfluorinated organic substituents. The most preferred polyfluorinated organic substituents include, but are not limited to, trifluoroacetic acid, polyfluorinated stearic acid, pentafluoropropionate, hexafluoroglutarate, difluorobenzoate, tetrafluoropyridine, and combinations thereof.

This second embodiment primarily focuses on introducing the $CO_2$-philic substituent into the multimetal cyanide compound. To accomplish this with the various $CO_2$-philic substituents, fluorine and/or the fluorine-based substituent may be incorporated, such as by being reacted, into the multimetal cyanide compound. As the fluorine-based substituent, the most preferred polyfluorinated organic substituents described above are adsorbed on the anionic catalytic centers of the multimetal cyanide compound via their acidic chain ends and reside on or near the surface of the catalyst thus rendering the surface $CO_2$-philic.

With the $CO_2$-philic substituent incorporated into the multimetal cyanide compound, the ionic, highly polar, and relatively $CO_2$-phobic multimetal cyanide compound is rendered less $CO_2$-phobic and less likely to repel the non-polar $CO_2$. As a result, $CO_2$ availability is increased in the liquid first reaction phase where the multimetal cyanide compound is present, specifically at catalytic sites on a surface of the multimetal cyanide compound. Preferably, the $CO_2$-philic substituent is introduced into the multimetal cyanide compound in an amount of at least 1%, more preferably of at least 10%, by weight based on a weight of the catalyst.

As described above, the catalyst includes the multimetal cyanide compound. In the present invention, a unique catalyst, specifically a unique multimetal cyanide compound, is utilized. In addition to the multimetal cyanide compound, it is preferred that the catalyst further comprises at least one of: an organic complexing agent; water; a polyether; and a surface-active substance. It is more preferred that the catalyst further include all of these additional components, specifically the organic complexing agent, water, the polyether, and the surface-active substance. As a result, the catalyst is preferably used in the form of a suspension and the multimetal cyanide compound preferably has a crystalline structure, rather than the catalyst being used in a powder form and being in an amorphous structure. The suspension and the crystalline structure provide high catalytic activity.

Furthermore, the multimetal cyanide compound preferably has a content of platelet-shaped (i.e., platelet-like morphology) particles of at least 30% by weight, based on a weight of the multimetal cyanide compound. For the purposes of the present invention, platelet-shaped particles are particles whose thickness is one third, preferably one fifth, more preferably one tenth, of their length and width. The more preferred catalyst according to the present invention contains more than 50% by weight of such platelet-shaped particles, most preferably more than 70% by weight. Concentrations that are employed for the catalysts are typically less than 1% by weight, preferably less than 0.5% by weight, particularly preferably less than 1,000 ppm, very particularly preferably less than 500 ppm, and especially preferably less than 100 ppm, based on the total mass of the PEC polyol.

A wide variety of catalysts which include the multimetal cyanide compound are possible for use in the context of the present invention. Examples of such catalysts include, but are not limited to the catalysts disclosed and taught in U.S. Pat. No. 6,762,278, the disclosure of which is hereby incorporated by reference in its entirety.

For the $CO_2$-philic compound or the $CO_2$-philic substituent to be effective they are clearly provided, i.e., present, during the reacting of the H-functional initiator, the alkylene oxide, and $CO_2$. This is true whether the $CO_2$-philic compound is being added to the liquid first reaction phase or the $CO_2$-philic substituent is being reacted into the multimetal cyanide compound. However, it is to be understood that the $CO_2$-philic compound or the $CO_2$-philic substituent can be initially provided, i.e., added, to the reactor during the reaction or can be initially provided, i.e., added, to the reactor prior to introduction of the reactants and prior to the beginning of the reaction.

The present invention is very useful for the formation, or synthesis, of PEC polyols having functionalities of from 1 to 8, preferably from 1 to 4, and number average molecular weights of from 200 to 20,000. The PEC polyols are formed by addition polymerization of the alkylene oxide and $CO_2$ onto the H-functional initiator, like mono-alcohols and poly-alcohols. Suitable H-functional initiators include, but are not limited to, alkanols such as butanol, diols such as butane diol, glycols such as dipropylene glycol, glycol monoalkyl ethers, aromatic hydroxy compounds, trimethylol propane, and pentaerythritol. It is possible for the H-functional initiator to include one or more alkylene oxide groups for the catalyst to function more efficiently. In such a case, the H-functional initiator is first reacted with at least one alkylene oxide to form an oligomer prior to it use to form the PEC polyol. Examples include glycerine having from 1 to 6 propylene oxides attached to it, propylene glycol having 1 to 6 propylene oxides, trimethyl propane with 1 to 6 propylene oxides, dipropylene glycol with one or more alkylene oxides attached, sucrose with one or more alkylene oxides attached, sorbitol with one or more alkylene oxides attached, and blends of these oligomers. As would be understood by one of ordinary skill in the art, the oligomer can be reacted with either the same alkylene oxide used during its formation or with another alkylene oxide in the PEC polyol formation reaction.

Suitable alkylene oxides include, but are not limited to, compounds having at least one alkylene oxide group, such as example ethylene oxide, 1,2-epoxypropane, 1,2-methyl-2-methylpropane, 1,2-epoxybutane, 2,3-epoxybutane, 1,2-methyl-3-methylbutane, 1,2-epoxypentane, 1,2-methyl-3-methylpentane, 1,2-epoxyhexane, 1,2-epoxyheptane, 1,2-epoxyoctane, 1,2-epoxynonane, 1,2-epoxydecane, 1,2-epoxyundecane, 1,2-epoxydodecane, styrene oxide, 1,2-epoxycyclopentane, 1,2-epoxycyclohexane, (2,3-epoxypropyl)-benzene, vinyloxirane, 3-phenoxy-1,2-epoxypropane, 2,3-epoxy (methyl ether), 2,3-epoxy (ethyl ether), 2,3-epoxy (isopropyl ether), 2,3-epoxy-1-propanol, 3,4-epoxybutyl stearate, 4,5-epoxypentyl acetate, 2,3-epoxy propyl methacrylate, 2,3-epoxypropyl acrylate, glycidol butyrate, methyl glycidate, ethyl 2,3-epoxybutanoate, 4-(trimethylsilyl)butane 1,2-epoxide, 4-(trimethylsilyl)butane 1,2-epoxide, 3-(perfluoromethyl)propene oxide, 3-perfluoromethyl)propene oxide, 3-(perfluorobutyl)propene oxide, and also any mixtures of the abovementioned compounds.

The desired $CO_2$ content of the PEC polyol is preferably from 1 to 30%, more preferably from 2 to 20%, and most preferably from 5 to 15%, based on weight % of $CO_3$ of the PEC polyol. The PEC polyols can be prepared either batch-wise, semi-continuously, or fully continuously. The process temperatures which can be employed in the synthesis typically range from 40° C. to 180° C., with preference being given to temperatures in the range from 90° C. to 130° C. Temperatures above 180° C. may result in catalyst decomposition and thus reduce catalyst activity. The $CO_2$ pressure during the reaction influences the amount of $CO_2$ incorporation. The $CO_2$ pressure may vary widely and range from 10 to 3,000 pounds per square inch (psi), preferably from 90 to 2,500 psi, and more preferably from 90 to 2,000 psi.

As initially described above, the PEC polyols formed according to the present invention are combined with the cross-linking agent to produce foamed and non-foamed polyurethane polymers. If the cross-linking agent is an isocyanate, the isocyanates that may be used include isomers and derivatives of toluene diisocyanate (TDI) and diphenylmethane diisocyanate (MDI). The reaction between the hydroxyl groups and the isocyanate groups may be catalyzed by tertiary amine catalysts and/or organic tin compounds such as stannous octoate and dibutyltin dilaureate. Also, to obtain a foamed polyurethane polymer, blowing agents may be employed. In addition, stabilizers and flame retardants may be added.

The following examples illustrating the formation of catalysts including the multimetal cyanide compound and formation of PEC polyols, as presented herein, are intended to illustrate and not limit the present invention.

EXAMPLES

Example 1

Comparative Multimetal Cyanide Compound Containing Catalyst

In Example 1, a conventional multimetal cyanide compound containing catalyst was prepared as follows.

Preparation of Hexacyanocobaltic Acid

An amount of 7 liters of strong acid ion exchanger in the sodium form (Amberlite® 252 Na, Rohm & Haas) was introduced into an ion exchange column (length: 1 m, volume: 7.7 l). The ion exchanger was subsequently converted into the H form by passing 10% strength hydrochloric acid through the ion exchange column for 9 hours at a rate of 2 bed volumes per hour, until the sodium content of the discharged solution was less than 1 ppm. The ion exchanger was subsequently washed with water until neutral. The regenerated ion exchanger was then used to prepare a hexacyanocobaltic acid which was essentially free of alkali metal. For this purpose, a 0.24 molar solution of potassium hexacyanocobaltate in water was passed through the ion exchanger at a rate of 1 bed volume per hour. After 2.5 bed volumes, the feed was changed from potassium hexacyanocobaltate solution to water. The 2.5 bed volumes obtained had an average hexacyanocobaltic acid content of 4.5% by weight and alkali metal contents of less than 1 ppm. The hexacyanocobaltic acid solutions used were diluted appropriately with water.

Preparation of a Catalyst Suspension Including the Multimetal Cyanide Compound

An amount of 479.3 g of an aqueous zinc acetate solution (13.8 g of zinc acetate dihydrate and 2.2 g of polyether Pluronic® PE 6200 (BASF Aktiengesellschaft) dissolved in 150 g of water) was heated to 50° C. While stirring (screw stirrer, stirring energy input: 1 W/l), 558 g of the aqueous hexacyanocobaltic acid solution (cobalt content: 9 g/l, 1.5% by weight of Pluronic® PE 6200 (BASF Aktiengesellschaft), based on the hexacyanocobaltic acid solution) were then metered in over a period of 20 minutes. After all the hexacyanocobaltic acid solution had been metered in, the mixture was stirred for a further 5 minutes at 50° C. The temperature was subsequently reduced to 40° C. over a period of one hour. The precipitated solid was separated from the liquid by means of a pressure filter and washed with water. The moist filter cake was subsequently dispersed in the amount of liquid required to give a 5% strength by weight multimetal cyanide suspension.

The conventional multimetal cyanide compound containing catalyst of Example 1 was prepared to illustrate the usefulness of introducing the $CO_2$-philic substituent into the multimetal cyanide compound compared to the conventional multimetal cyanide compound containing catalysts.

Examples 2-5

Catalysts including the multimetal cyanide compound and the $CO_2$-philic compound or the $CO_2$-philic substituent were prepared according to the general method described above and as further detailed in the table below.

| Example | Multimetal Cyanide Compound | Detail |
|---|---|---|
| 2 | $Zn_3[Co(CN)_6]_2 \cdot Zn(OAc)_2$ In the presence of a perfluorostearate | $Zn(OAc)_2 \cdot 2H_2O$ and $K_3[Co(CN)_6]$ and perfluorinated stearate reacted together to produce the precursor, which was recrystallized with $Zn(OAc)_2 \cdot H_2O$ and additional perfluorinated stearate. |
| 3 | $Zn_3[Co(CN)_6]_2 \cdot Zn(OAc)_2$ In the presence of a perfluorophosphate | $Zn(OAc)_2 \cdot 2H_2O$ and $K_3[Co(CN)_6]$ and perfluorinated phosphate reacted together to produce the precursor, which was recrystallized with $Zn(OAc)_2 \cdot H_2O$. |
| 4 | $Zn_3[Co(CN)_6]_2 \cdot Zn(OAc)_2$ In the presence of a pentafluoropyridine | $Zn(OAc)_2 \cdot 2H_2O$ and DMC precursor recrystallized together in the presence of (1 eq pentafluoropyridine/Zn) |
| 5 | $Zn_3[Co(CN)_6]_2 \cdot Zn(OAc)_2$ In the presence of a perfluoropropionate | $Zn(OAc)_2 \cdot 2H_2O$ and $K_3[Co(CN)_6]$ and perfluorinated thio propionate reacted together to produce the precursor, which was recrystallized with $Zn(OAc)_2 \cdot H_2O$. |

Preparation of PEC Polyols

The catalysts of Examples 2-5, which contain the multimetal cyanide compound and the $CO_2$-philic compound or the $CO_2$-philic substituent, were used to prepare PEC polyols using a general procedure described below.

A clean and dry 300 ml autoclave, equipped with an agitator, external heating, internal cooling via a cooling coil, a propylene oxide feed line, a carbon dioxide gas feed line, a temperature sensor and a pressure sensor, was charged with 70 g of the H-functional initiator and the catalysts of Examples 2-5 above. The H-functional initiator used in these experiments was an adduct of glycerine and propylene oxide monomer with a number average molecular weight of 730, a water content <0.03% and a residual catalyst content <5 ppm. The initiator-catalyst mixture was heated to 110-130° C. under vacuum (<1 mm Hg) for 2 hours to remove any residual moisture. The vacuum system was disconnected and the reactor pressurized to 0 psi using Argon gas. Then 5 g of propylene oxide was added and the pressure increase in the reactor was monitored. Within 15-30 minutes the reactor pressure declines back to 0 psi, indicating that the multimetal cyanide compound containing catalyst has been activated and is now active. Then 170 g propylene oxide (PO) monomer is added at 110-130° C. at a constant rate of 1 g/min. After 5 minutes of the PO feed, the reactor was pressurized with $CO_2$ gas (Air Products, research grade) for the duration of the PO feed.

Following the completion of the PO addition step, unreacted monomer was left to react out at 110-130° C. The reactor was then vented and cooled and the product collected. The peak molecular weight and the weight average molecular weight were determined by gel permeation chromatography. The viscosity was measured using a Brookfield DV-III rheometer. The carbonate composition of the PEC polyol was determined by IR (peak at 1745 cm-1) and calculated as weight % $CO_3$ in the polymer. Propylene carbonate formed as a byproduct was not removed. The amount of propylene carbonate formed was also determined by IR and is expressed in weight %.

Example 6

The PEC polyol of Example 6 was prepared according to the general procedure described above using the multimetal cyanide compound of Example 2. An amount of 0.2 g of the multimetal cyanide compound containing catalyst was used. The reaction temperature was 110° C. and the reactor was pressurized with $CO_2$ to 900 psi. The yield of the reaction product obtained was 254 g. Its peak molecular weight was 994 and its weight average molecular weight was 20,096. The PEC polyol product had a polydispersity Mw/Mn of 7.98. The carbonate composition of the PEC polyol was 12.3%. Propylene carbonate was present at 2.7%.

The PEC polyol product obtained in Example 6 using the modified multimetal cyanide compound containing catalyst of Example 2 demonstrated high activity toward $CO_2$ inclusion into the PEC polyol and at the same time significantly increased selectivity and reduced propylene carbonate byproduct formation.

Example 7

The PEC polyol of Example 7 was prepared according to the general procedure described above using the multimetal cyanide compound of Example 3. An amount of 0.2 g of the multimetal cyanide compound containing catalyst was used. The reaction temperature was 110° C. and the reactor was pressurized with $CO_2$ to 900 psi. The yield of the reaction product obtained was 261 g. Its peak molecular weight was 1,284 and its weight average molecular weight was 17,271. The PEC polyol product had a polydispersity Mw/Mn of 7.14. The carbonate composition of the PEC polyol was 13.1%. Propylene carbonate was present at 4.4%.

The PEC polyol product obtained in Example 7 using the modified multimetal cyanide compound containing catalyst of Example 3 demonstrated high activity toward $CO_2$ inclusion into the PEC polyol and at the same time significantly increased selectivity and reduced propylene carbonate byproduct formation.

Example 8

The PEC polyol of Example 8 was prepared according to the general procedure described above using the multimetal cyanide compound of Example 4. An amount of 0.2 g of the multimetal cyanide compound containing catalyst was used. The reaction temperature was 110° C. and the reactor was pressurized with $CO_2$ to 900 psi. The yield of the reaction product obtained was 274 g. Its peak molecular weight was 1,228 and its weight average molecular weight was 13,331. The PEC polyol product had a polydispersity Mw/Mn of 5.73. The carbonate composition of the PEC polyol was 12.6%. Propylene carbonate was present at 10.5%.

The PEC polyol product obtained in Example 8 using the modified multimetal cyanide compound containing catalyst of Example 4 demonstrated high activity toward $CO_2$ inclusion into the PEC polyol and at the same time significantly increased selectivity and reduced propylene carbonate byproduct formation.

Example 9

The PEC polyol of Example 9 was prepared according to the general procedure described above using the multimetal cyanide compound of Example 5. An amount of 0.2 g of the multimetal cyanide compound containing catalyst was used. The reaction temperature was 110° C. and the reactor was pressurized with $CO_2$ to 900 psi. The yield of the reaction product obtained was 271 g. Its peak molecular weight was 1,525 and its weight average molecular weight was 6,284. The PEC polyol product had a polydispersity Mw/Mn of 2.72. The carbonate composition of the PEC polyol was 11.9%. Propylene carbonate was present at 5.2%.

The PEC polyol product obtained in Example 9 using the modified multimetal cyanide compound containing catalyst of Example 5 demonstrated high activity toward $CO_2$ inclusion into the PEC polyol and at the same time significantly increased selectivity and reduced propylene carbonate byproduct formation.

Example 10

The PEC polyol of Example 10 was prepared according to the general procedure described above using the conventional multimetal cyanide compound of Example 1. An amount of 0.5 g of the multimetal cyanide compound containing catalyst was used. Additionally, 1 g of 2-perfluoroalkylethylstearate (ZONYL® FTS) was added to the initiator mixture as the $CO_2$-philic compound. The reaction temperature was 110° C. and the reactor was pressurized with $CO_2$ to 900 psi. The yield of the reaction product obtained was 281 g. Its peak molecular weight was 2,035 and its weight average molecular weight was 2,847. The PEC polyol product had a polydispersity Mw/Mn of 1.21. The carbonate composition of the PEC polyol was 13.8%. Propylene carbonate was present at 11.9%.

The PEC polyol product obtained in Example 10 using the conventional multimetal cyanide compound containing catalyst of Example 1 and the $CO_2$-philic compound demonstrated high activity toward $CO_2$ inclusion into the PEC polyol and at the same time significantly increased selectivity and reduced propylene carbonate byproduct formation.

Examples 11 and 12

Comparative PEC Polyols

For Examples 11 and 12, a conventional multimetal cyanide compound containing catalyst equivalent to that described above in Example 1 was used to prepare conventional PEC polyols for comparison purposes. The PEC polyols of Examples 11 and 12 were prepared by the general procedure used for preparing PEC polyols described above.

Example 11

The conventional PEC polyol of Example 11 was prepared according to the general procedure described above using a conventional multimetal cyanide compound equivalent to that described in Example 1. An amount of 0.5 g of the multimetal cyanide compound containing catalyst was used. The reaction temperature was 130° C. and the reactor was pressurized with $CO_2$ to 300 psi. The yield of the reaction product obtained was 247 g. Its peak molecular weight was 1,825 and its weight average molecular weight was 2,805. The PEC polyol product had a polydispersity Mw/Mn of 1.24. The carbonate composition of the conventional PEC polyol was 3.9%. Propylene carbonate was present at 2.7%.

Example 12

The conventional PEC polyol of Example 12 was prepared according to the general procedure described above using a conventional multimetal cyanide compound equivalent to that described above in Example 1. An amount of 0.5 g of the multimetal cyanide compound containing catalyst was used. The reaction temperature was 110° C. and the reactor was pressurized with $CO_2$ to 900 psi. The yield of the reaction product obtained was 287 g. Its peak molecular weight was 1,805 and its weight average molecular weight was 3,015. The PEC polyol product had a polydispersity Mw/Mn of 1.33. The carbonate composition of the conventional PEC polyol was 12.9%. Propylene carbonate was present at 15.5%.

The invention has been described in an illustrative manner, and it is to be understood that the terminology which has been used is intended to be in the nature of words of description rather than of limitation. Obviously, many modifications and variations of the present invention are possible in light of the above teachings, and the invention may be practiced otherwise than as specifically described.

What is claimed is:

1. A method of forming a polyethercarbonate polyol, said method comprising the steps of:
    providing a catalyst comprising a multimetal cyanide compound;
    reacting an H-functional initiator, an alkylene oxide, and $CO_2$ in the presence of the catalyst comprising the multimetal cyanide compound in a reactor to form the polyethercarbonate polyol; and
    providing a fluorine-based compound or a $CO_2$-philic substituent selected from the group of fluorine, a fluorine-based substituent, and combinations thereof.

2. A method as set forth in claim 1 wherein the fluorine-based compound has a first segment comprising a polyether and a second segment comprising a polyfluorinated alcohol, a polyfluorinated fatty acid, a polyfluorinated alkyl compound, a polyfluorinated phosphate, or a polyfluorinated alkyl propionate.

3. A method as set forth in claim 1 wherein the fluorine-based compound is selected from the group of 2-peffluoroalkylethylstearate, 2-peffluoroalkylethanol, 2-(perfluoroalkyl)ethyl phosphate, fluoropyridine, peffluoroalkylpropionate, and combinations thereof.

4. A method as set forth in claim 1 wherein the fluorine-based substituent-comprises a polyfluorinated organic substituent.

5. A method as set forth in claim 4 wherein the polyfluorinated organic substituent is selected from the group of trifluoroacetic acid, polyfluorinated stearic acid, pentafluoropropionate, hexafluoroglutarate, difluorobenzoate, tetrafluoropyridine, and combinations thereof.

6. A method as set forth in claim 1 wherein the step of providing the fluorine-based compound or the $CO_2$-philic substituent comprises adding the fluorine-based compound or the $CO_2$-philic substituent during the reacting of the H-functional initiator, the alkylene oxide, and $CO_2$.

7. A method as set forth in claim 1 wherein first and second reaction phases are present in the reactor with the first reaction phase being liquid and comprising the H-functional initiator, dissolved alkylene oxide and carbon dioxide, the multimetal cyanide compound, and the forming polyethercarbonate polyol, and with the second reaction phase comprising gaseous or supercritical alkylene oxide and $CO_2$.

8. A method as set forth in claim 7 wherein the step of providing the fluorine-based compound or the $CO_2$-philic substituent comprises providing the fluorine-based compound into the first reaction phase.

9. A method as set forth in claim 8 wherein the step of providing the fluorine-based compound into the first reaction phase comprises providing the fluorine-based compound in an amount of at least 10% by weight based on a weight of the catalyst.

10. A method as set forth in claim 1 wherein the fluorine-based compound has a first segment comprising a polyether and a second segment comprising a polyfluorinated alcohol, a polyfluorinated fatty acid, a polyfluorinated alkyl compound, a polyfluorinated phosphate, or a polyfluorinated alkyl propionate.

11. A method as set forth in claim 1 wherein the step of providing the fluorine-based compound or the $CO_2$-philic substituent comprises introducing the $CO_2$-philic substituent into the multimetal cyanide compound.

12. A method as set forth in claim 11 wherein the step of introducing the $CO_2$-philic substituent into the multimetal cyanide compound comprises introducing the $CO_2$-philic substituent into the multimetal cyanide compound in an amount of at least 1% by weight based on a weight of the catalyst.

13. A method as set forth in claim 11 wherein the step of introducing the $CO_2$-philic substituent into the multimetal cyanide compound comprises incorporating fluorine into the multimetal cyanide compound.

14. A method as set forth in claim 11 wherein the step of introducing the $CO_2$-philic substituent into the multimetal cyanide compound comprises incorporating the fluorine-based substituent into the multimetal cyanide compound.

15. A method as set forth in claim 14 wherein the fluorine-based substituent comprises a polyfluorinated organic substituent.

16. A method as set forth in claim 1 wherein the step of reacting the H-functional initiator, the alkylene oxide, and $CO_2$ comprises reacting the H-functional initiator, the alkylene oxide, and $CO_2$ under a positive pressure.

17. A method as set forth in claim 1 wherein the catalyst further comprises at least one of: an organic complexing agent; water; a polyether; and a surface-active substance.

18. A method as set forth in claim 17 wherein the multimetal cyanide compound has a crystalline structure and a content of platelet-shaped particles of at least 30% by weight, based on a weight of the multimetal cyanide compound.

19. A method of forming a polyethercarbonate polyol, said method comprising the steps of:
    providing a catalyst comprising a multimetal cyanide compound;
    reacting an H-functional initiator, an alkylene oxide, and $CO_2$ in the presence of the catalyst comprising the multimetal cyanide compound in a reactor to form the polyethercarbonate polyol; and
    providing a fluorine-based compound.

20. A method as set forth in claim 19 wherein the step of providing the fluorine-based compound comprises providing the fluorine-based compound during the reacting of the H-functional initiator, the alkylene oxide, and $CO_2$.

21. A method as set forth in claim 19 wherein the fluorine-based compound has a first segment comprising a polyether and a second segment comprising a polyfluorinated alcohol, a polyfluorinated fatty acid, a polyfluorinated alkyl compound, a polyfluorinated phosphate, or a polyfluorinated alkyl propionate.

22. A method as set forth in claim 19 wherein first and second reaction phases are present in the reactor with the first reaction phase being liquid and comprising the H-functional initiator, dissolved alkylene oxide and carbon dioxide, the multimetal cyanide compound, and the forming polyethercarbonate polyol, and with the second reaction phase comprising gaseous or supercritical alkylene oxide and $CO_2$.

23. A method as set forth in claim 22 wherein the step of providing the fluorine-based compound comprises providing the fluorine-based compound into the first reaction phase.

24. A method as set forth in claim 19 wherein the step of providing the fluorine-based compound comprises providing the fluorine-based compound in an amount of at least 10% by weight based on a weight of the catalyst.

25. A method of forming a polyethercarbonate polyol, said method comprising the steps of:
providing a catalyst comprising a multimetal cyanide compound;
reacting an H-functional initiator, an alkylene oxide, and $CO_2$ in the presence of the catalyst comprising the multimetal cyanide compound in a reactor to form the polyethercarbonate polyol; and
providing a $CO_2$-philic substituent selected from the group of fluorine, a fluorine-based substituent, and combinations thereof.

26. A method as set forth in claim 25 wherein the step of providing the $CO_2$-philic substituent comprises introducing the $CO_2$-philic substituent prior to the reacting of the H-functional initiator, the alkylene oxide, and $CO_2$.

27. A method as set forth in claim 25 wherein the step of providing the $CO_2$-philic substituent comprises introducing the $CO_2$-philic substituent during the reacting of the H-functional initiator, the alkylene oxide, and $CO_2$.

28. A method as set forth in claim 25 wherein the fluorine-based substituent comprises a polyfluorinated organic substituent.

29. A method as set forth in claim 25 wherein the step of providing the $CO_2$-philic substituent comprises introducing the $CO_2$-philic substituent into the multimetal cyanide compound.

30. A method as set forth in claim 29 wherein the step of introducing the $CO_2$-philic substituent into the multimetal cyanide compound comprises introducing the $CO_2$-philic substituent into the multimetal cyanide compound in an amount of at least 1% by weight based on a weight of the catalyst.

31. A method as set forth in claim 29 wherein the step of introducing the $CO_2$-philic substituent into the multimetal cyanide compound comprises incorporating fluorine into the multimetal cyanide compound.

32. A method as set forth in claim 29 wherein the step of introducing the $CO_2$-philic substituent into the multimetal cyanide compound comprises incorporating the fluorine-based substituent into the multimetal cyanide compound.

* * * * *